United States Patent [19]

Barton

[11] Patent Number: 5,761,325

[45] Date of Patent: Jun. 2, 1998

[54] DIGITAL HALFTONE RENDERING OF A GRAY SCALE IMAGE WITH FREQUENCY-DEPENDENT DIAGONAL CORRELATION

[75] Inventor: David C. Barton, Vancouver, Wash.

[73] Assignee: Hewlett-Packard Company, Palo Alto, Calif.

[21] Appl. No.: 612,702

[22] Filed: Mar. 7, 1996

Related U.S. Application Data

[62] Division of Ser. No. 345,289, Nov. 28, 1994, Pat. No. 5,526,438.

[51] Int. Cl.⁶ .................................................. G06K 9/00
[52] U.S. Cl. ............................................ 382/100; 382/237
[58] Field of Search ..................................... 382/100, 112, 382/237, 252; 358/526, 534, 535, 536, 456, 457, 458, 459, 298, 302; 395/109, 111; 347/3, 15, 77, 78, 106, 131, 183, 240, 251

[56] References Cited

PUBLICATIONS

Gonzalez et al., "Digital Image Processing" 1992, pp. 663–664.

*Primary Examiner*—Leo Boudreau
*Assistant Examiner*—Phuoc Tran

[57] ABSTRACT

A method of halftoning a digital gray scale image is disclosed that utilizes a point by point thresholding comparison to a novel diagonal correlation dither matrix. The new dither matrix forces diagonal correlation of adjacent dots in the output image while maximizing dispersion of dots, thereby producing visually unobtrusive output dot patterns. The matrix is generated according to a spatial domain cost function that determines a cost value for each candidate pixel based on respective radial distances and relative angles between a candidate pixel and the ON pixels in the matrix such that unit diagonals are favored over placement of vertically or horizontally adjacent dots.

4 Claims, 7 Drawing Sheets

DIGITAL HALFTONE RENDERING OF A GRAY SCALE IMAGE WITH FREQUENCY-DEPENDENT DIAGONAL CORRELATION

This is a divisional of application Ser. No. 08/345,289 filed on Nov. 28, 1994, now U.S. Pat. No. 5,526,438.

This application relates generally to digital halftoning, and, more specifically, to methods of rendering a gray scale image by utilizing a point by point halftoning operation against a novel dither matrix or "mask" that imposes controlled amounts of diagonal correlation in the binary output array. Methods of generating a dither matrix, also called a threshold array, with frequency-dependent diagonal correlation for use in dispersed-dot ordered dither techniques are disclosed.

BACKGROUND OF THE INVENTION

Digital image data must be transformed or pre-processed so that computer display terminals with various grey level capacities, laser printers, dot matrix printers, inkjet printers etc., many having different resolutions and aspect ratios, will all render an image represented by the image data in a similar way. A pre-processor associated with or configured for each such output device transforms the digital data to a form tailored to the characteristics of that particular device.

Digital halftoning is a key component of such a pre-processor. This term refers to any process that creates the illusion of continuous tone images by judicious arrangement of binary picture elements, such as ink drops in the case of inkjet printers. Digital halftoning is sometimes called spatial dithering.

Various digital halftoning techniques are known. They generally fall into one of two broad classes, depending on the type of dot created, dispersed, or clustered. If a display device can successfully accommodate an isolated black or white pixel, then by far the preferred choice is dispersed-dot halftoning, which maximizes the use of resolution. A clustered-dot halftone mimics the photoengraving process used in printing, for tiny pixels collectively form dots of various sizes.

There is also a choice of computational complexity that can be accepted. A "point operation" in image processing refers to any algorithm which produces output for a given location based only on the single input pixel at that location, independent of its neighbors. Thus, in point operations, halftoning is accomplished by a simple pointwise comparison of the input image against a predetermined threshold array or mask. For every point or pixel in the input image, depending on which point value is larger—the gray scale image or the mask—either a 1 or 0, respectively, is placed at the corresponding location in the binary output image. While various masks may be used, the general procedure for point halftoning is known. Details of such a procedure are disclosed in U.S. Pat. No. 5,111,310 to Parker, et al., said patent being incorporated herein by this reference. For applications where minimizing computation time and/or hardware is a premium, a point operation is preferred. Neighborhood operations, also called error diffusion, are more computationally intensive but generally produce higher quality results.

Dispersed-dot ordered dither (a point operation) is implemented by use of a dither matrix or threshold array, also called a mask. Hereinafter we will refer to such as a dither matrix. Halftoning with a particular homogenous dither matrix has become known as "Bayer's dither." According to Bayer's dither, methods such as recursive tessellation are used for generating optimally homogenous ordered dither matrices. According to those techniques, the goal in generating a dither matrix is to order the samples so that, as each successive position or point is numbered (turned on), the total two dimensional ensemble of "on" points remains as homogeneously arranged as possible. When matrices of this type are used as threshold arrays, the corresponding arrangement of output binary dots will be dispersed as homogeneously as possible for each gray level to be simulated.

Known ordered-dither techniques such as Bayer's dither, in some circumstances generate patterns or anomalies that appear in a rendered image in areas where the source image is of constant gray value (or nearly so). While some of these patterns are unobtrusive, and an element of subjective judgement is involved in any case, the need remains for improving output image quality in halftone systems by use of an improved dither matrix.

SUMMARY OF THE INVENTION

To create a dither matrix according to the invention, a minimum gray scale or tone level T is selected as an initial starting point. This is the minimum non-zero gray level that can be distinguished in the system of interest. In other words, it is the minimum gray scale increment or resolution. A dither matrix having a desired size is initialized to the minimum tone level T=1. A checkerboard arrangement of ON dots is preferred as the starting point as it is homogeneous and easily generated. To generate the next tone value, T=2, every OFF dot location in the matrix, called a "candidate pixel", is examined and a corresponding error term or "cost function" is determined. The candidate pixel with the least error or minimum cost function is chosen, and the corresponding location in the matrix is turned ON for the present tone level. This process continues to turn ON more pixels until the desired tone level is achieved.

Next the tone level T is incremented (T=3), and the foregoing process is repeated for each subsequent tone level, in order of increasing tone level, until the complete matrix has been generated. A separate matrix may be generated and stored for each tone level. However, it is convenient and saves memory space to combine all the dot patterns into a single "dither matrix" in which each location of the matrix has a binary value equal to the minimum tone value for which that location is ON.

The cost function is specially designed to maximize dispersion, enforce diagonal correlation when dispersion fails (dots touch), and minimize visible patterns in both the dot structure and the dither matrix tiling. In the preferred embodiment, the cost function for a given candidate pixel is determined by examining the ON dots within a defined "search area" having the candidate at its center. An individual "cost value" for each such ON dot with in the search area is determined, and the sum of these cost values is the total cost function for that candidate pixel. Each cost value is related to both the angular location and radial distance of the ON dot relative to the candidate pixel location.

The cost value is an inverse exponential function of radial distance between a candidate pixel and an ON pixel. Preferably, the radial distance is exponentiated to at least the third power. This has the advantage of sharply reducing the influence of groups of dots that are disproportionately tightly packed relative to the rest of the dither matrix. Such a group will have little more influence on the cost function than a single dot at the location of the group dot closest to the candidate pixel. Conversely, groups that are disproportionately loosely packed relative to the rest of the dither matrix will have somewhat greater influence, but still less than the surrounding region.

The cost value also is a function of relative angle between a candidate pixel and the ON dot. The cost function includes a sine term arranged so that the cost is minimized at 45 degrees relative angle. This implements the preference for diagonal correlation over vertical or horizontally adjacent dots. The new cost function also takes into account target output device dot size, to ensure that all dots that touch are diagonally adjacent, even if they touch at a distance greater than one unit.

The foregoing and other objects, features and advantages of the invention will become more readily apparent from the following detailed description of a preferred embodiment which proceeds with reference to the drawings.

The text of this specification also includes the following Tables:

Table 1. Search area for 50 ON Dots.

Table 2. Cost values for selected radial distances and relative angles.

Table 3. Cost values for the candidate pixels illustrated in FIG. 3.

DETAILED DESCRIPTION OF A PREFERRED EMBODIMENT

The most important distinguishing characteristic of a dither matrix, or a method of generating a dither matrix, is how error terms are defined. For example, a clustered dither uses an error term that forces a spiral sequence of dots, clumping 100% together. Bayer's dither uses an error term that seeks the center of the largest void formed by the vertices of polygons with previous dots as their centers.

Most dither matrices are designed to produce a dispersed pattern of dots because it is the most pleasing. By definition, dispersed means negligible low frequency content. In fact, the conventional wisdom calls for a blue spectrum as a requirement for any good dither matrix. A dither matrix according to the present invention is comprised almost entirely of highly correlated, low frequency energy, as more fully described below, squarely contrary to the blue noise characteristics of known techniques.

One known method for rendering a halftone image of a gray scale image is described in Parker et al., U.S. Pat. No. 5,111,310. That method utilizes a pixel-by-pixel comparison against a predetermined blue noise mask. The blue noise matrix is first optimized for a particular tone value (50%). Then dots are added or removed successively to generate the remaining tone levels. Overall, that method results in tone levels that resemble the optimized tone level less and less the further away they are from the optimized level. For example, a tone level of 10% will look much less ideal (maybe even noisy) than a tone level of 50% if 50% was the optimized level.

Figure 1:
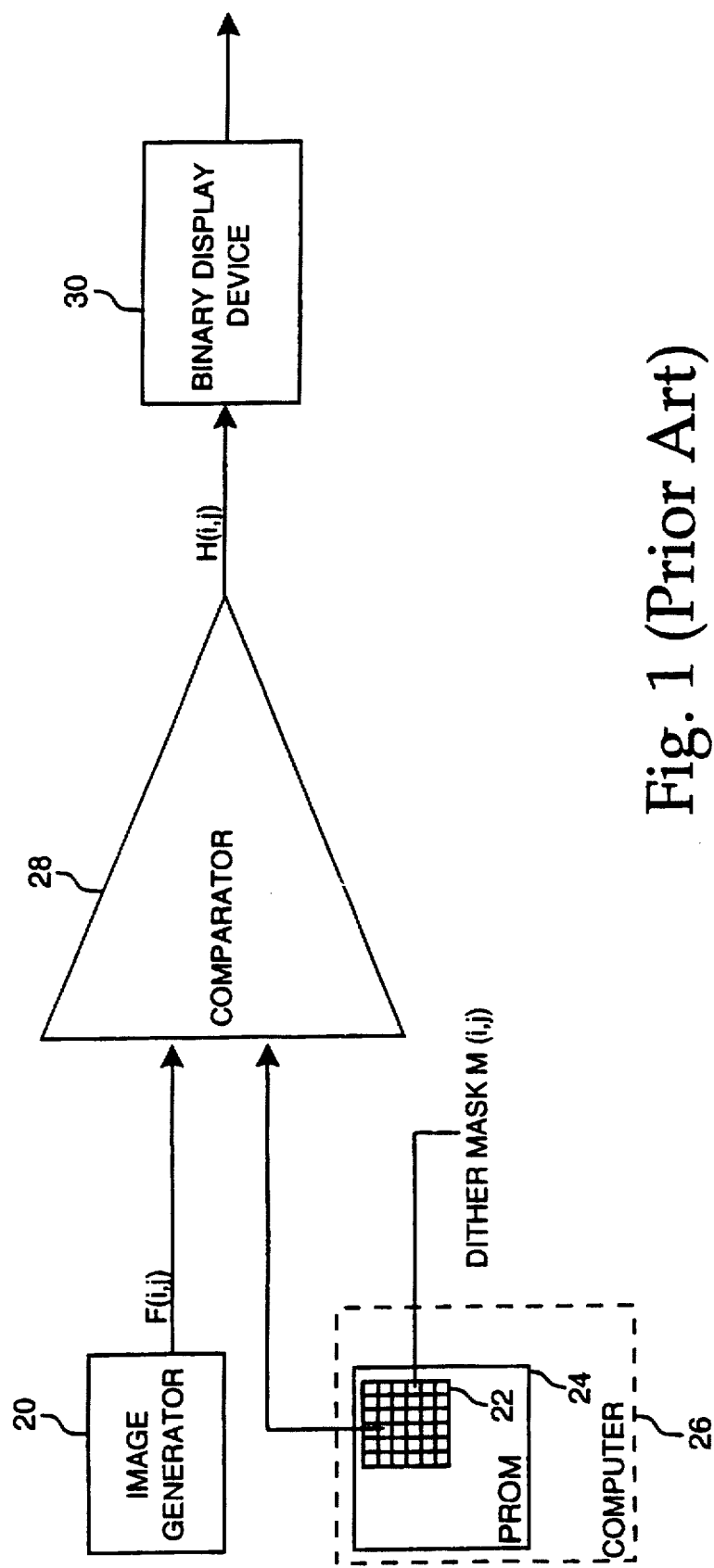
FIG. 1 is a block diagram of a system for halftoning a digital image according to a stored dither mask and rendering the halftoned image on a binary display device.

FIG. 1 illustrates generally how a dither matrix is used in digital halftoning. In FIG. 1, an image generator 20 represents any source of two-dimensional image data, represented as a matrix or array of pixels F(i,j) in which each location has a corresponding color or gray scale tone value. Such image data may be generated for example by a scanner, by drawing software, or by a word processing program that uses a graphic (rather than a character mode of output. A dither matrix or mask 22 is stored in a programmable read-only memory (PROM) 24 or the like. PROM 24 may be disposed in a computer 26, or it may form part of a binary output display device 30. The display device may be for example a CRT display screen, or a printer such as a laser or ink-jet printer. It is a matter of system design choice as to whether halftoning and other preprocessing steps are carried out in a host computer or in the output device itself.

Each pixel of the source image F(i,j) is compared to the corresponding location in the mask M (i,j) in a comparator 28. Comparator 28 may be formed of digital hardware, and may be disposed within a host computer or within the display device. Preferably, comparator 28 is implemented in software, though the exact implementation is a matter of design choice. Comparator 28 provides an output (halftone) binary image array H(i,j) which is fed into the binary display device 30. The exact pattern of dots in the output image depends upon the source image and the dither matrix.

Method of Dither Matrix Generation

The model I developed to judge the quality of an arrangement of dots has several qualities, the first of which is that the dot arrangement must be dispersed. The second desired quality is that the dot arrangement must minimize detectable patterns to the viewer. I choose to enforce correlation at tone levels where dots touch rather than let them touch at random angles. My reasoning for this is that, when dots touch, the "event," or resulting larger dot is more significant to the eye than an individual dot. I have found that the shape of these larger dots is less objectionable when controlled rather than random. Human contrast sensitivity is weakest at diagonal angles. For this reason I decided to make all dots touch at diagonals if they must touch at all. In tone levels where dots do not touch, I enforce as much dispersion as possible. Another requirement to avoid detectable patterns is that the dither matrix must not repeat itself on the page in a manner that is visible.

To generate such a "diagonal correlation" dither matrix, I begin with the lightest (minimum) tone level optimized, and build from there. To build each subsequent tone level, I use a cost function that minimizes the sum of the weighted radial distances between a candidate pixel and all existing ("ON") pixels within a certain radial distance or "search area". This is distinguished from seeking the largest void in that the "weighted radial distance" is the measured distance modified with a function that increases as a function of distance and relative angle. This weighted distance is then inverted and cubed. The net result is that, in very sparse tone levels, the largest void is sought, with a slight favoritism given to diagonal correlation. But, as tone level increases, the largest void gets smaller, and the diagonal favoritism becomes more significant at a rate determined by a function that takes target output device dot size into account. Finally, as tone level increases to a point where dots touch each other, all "touching" occurs among diagonally adjacent dots and darker tone levels are built up with short diagonal lines.

This methodology results in a dither matrix that is formed of highly correlated, low frequency energy at nearly all tone levels, in stark contrast to the prior art which teaches maximum homogeneity and dispersion. Overall, a gray scale ramp printed using this matrix is very uniform and smooth in the highlights, with low frequency energy in the form of short diagonals. Finally, all tone levels are built with diagonals. One extension of this methodology would be to use a cost function that favored a different angle (other than 45°), depending on the tone level.

The general method is illustrated by the flow diagram of FIG. 2, described next. The first step is initializing a dither matrix 50 to a zero state, i.e. one in which all pixels or locations are set to zero or off. The letter M refers to the dither matrix. I assume a square matrix (N by N units or pixels) for convenience and simplicity of processing though it need not necessarily have that shape. Next the matrix is set to a minimum tone value in step 52. An image file may have, for example, eight bits per pixel, which allows 256 gray scale tone levels. The minimum tone level T=1 in that case corresponds to 1 out of 256 bits turned on. L, an ON bit counter, is initialized to 64, the number of ON bits corresponding to T=1 for N=128.

A checkerboard pattern is preferred for initializing the dither matrix to the minimum tone value. Next, the tone value is incremented in step 54 to begin generating a pattern for the next tone level. Matrix row and column indexes, i and j respectively, are initialized to 0 in step 56 for sequentially examining each dot location in the matrix beginning in the upper left hand corner. While the illustration shows a raster order of processing, the sequence is unimportant. Every location in the matrix will be examined in due course.

Following initialization, the first location in the matrix M(i,j)=0,0 is examined in step 58 to determine whether that dot is ON. The term ON is used here to indicate that the corresponding matrix location has a non-zero value. A separate matrix can be generated for each desired tone level, in which case each location of the matrix need only comprise a single bit. Alternatively, all of the threshold information may be combined into a single dither matrix, in which case each location of the matrix comprises a number of bits corresponding to the gray scale resolution. Thus, in a 265 level system, each location of the combined dither matrix comprises 8 bits for indicating a corresponding tone level threshold value.

If test 58 determines that the present dot location is OFF, i.e. its value is zero, then the present location is a "candidate pixel," to be considered for inclusion at the present tone level. Step 60 is to determine a total cost value for that candidate pixel, using a cost function described below. If test 58 determines that the present matrix location is already on, it is not a candidate, and control proceeds as indicated by path 68 to skip the cost function step 60. Next, test 64 indicates whether or not the column index j has reached the end of the present row of the matrix M. If not, column index J is incremented in step 66 and control returns via path 76 to examine the next dot location in step 58. Alternatively, if the end of the row is encountered, test 70 is executed to determine whether the row index i has reached the bottom row of the matrix. If not, the row index i is incremented in step 72, the column index J is reset to zero in step 74, and control returns as before to examine the next location in raster order in step 58.

The foregoing steps are repeated, sequentially incrementing the column and row counters, until every location of the entire matrix has been examined. The next step is selecting a single minimum cost candidate out of all of the candidates that have been considered, step 78. There can be cases where two or more candidate pixels have the same cost associated with them and that cost is also the minimum cost for the next dot. In such cases, we must decide between two or more decisions of equal cost. I treat this decision as a potential source of error in the cost function that needs to be "whitened" so I choose randomly between the equal candidates. Another technique is to temporarily store a "low cost candidate pixel location" and replace it every time a candidate having a lower cost is discovered.

The selected minimum cost candidate M(x,y) is set to the current tone value which is 2, in step 80. The ON dot counter L is incremented in step 82. Next, step 84 determines whether or not the total number of ON bits corresponds to the present tone level. If not, control returns to step 56 to reset the row and column indices and begin examining the entire matrix over again, in order to identify and consider additional candidate pixels for inclusion as ON pixels at the this tone level. This process is repeated until the present tone level is completed as indicated in test 84. Next, test 88 determines whether or not all of the available tone levels (e.g. 256) have been included in the dither matrix. If not, control flows back to step 54 where the tone level is incremented. The row and column indices again are reset in step 56 and processing proceeds as described above for generating additional ON bits for the new tone level. When all of the tone level have been processed, as indicated by test 88, the process is completed.

The Cost Function in General

Figure 2:
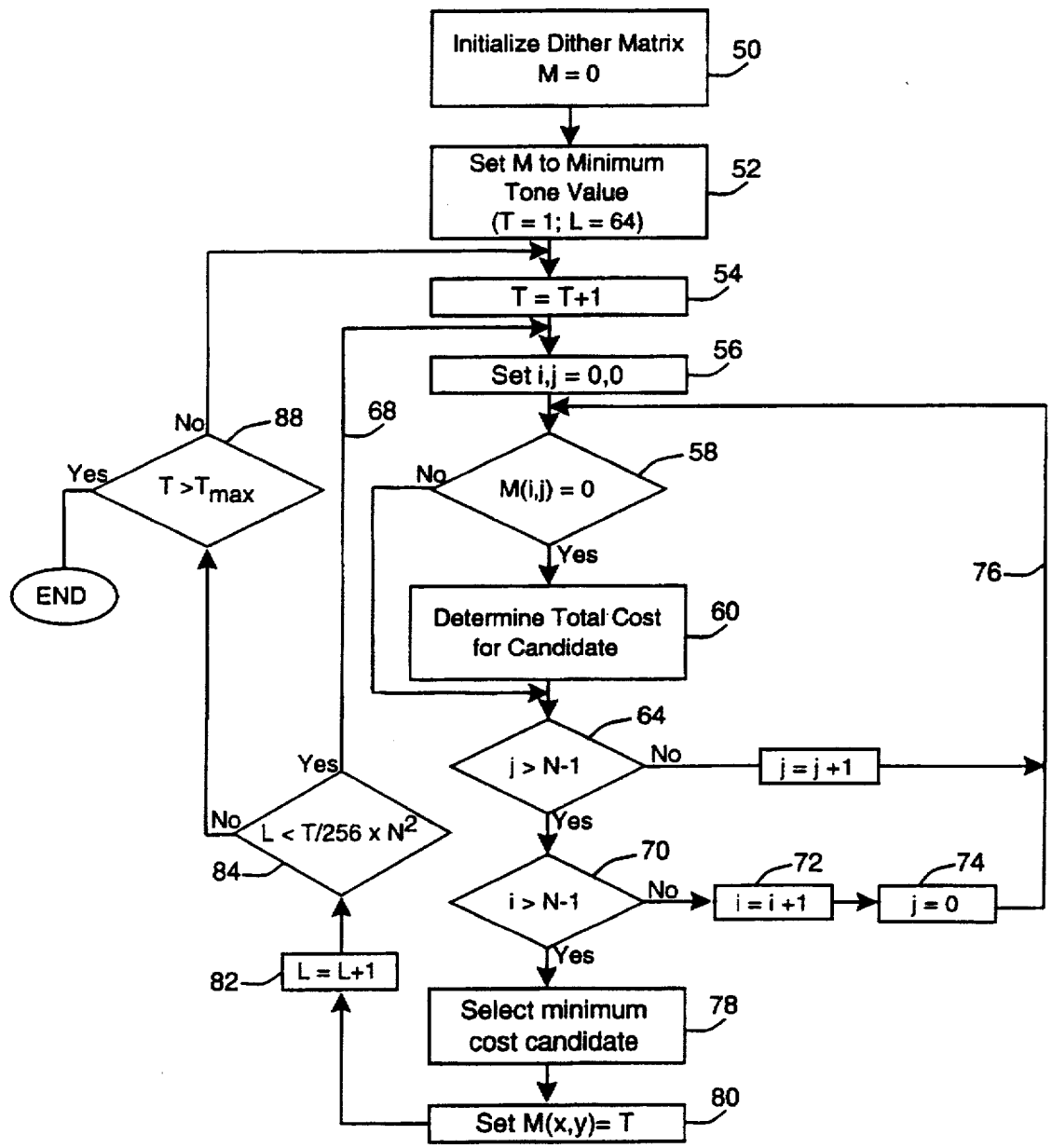
FIG. 2 is a flow diagram of a method of generating a dither matrix according to the present invention.
Figure 4:
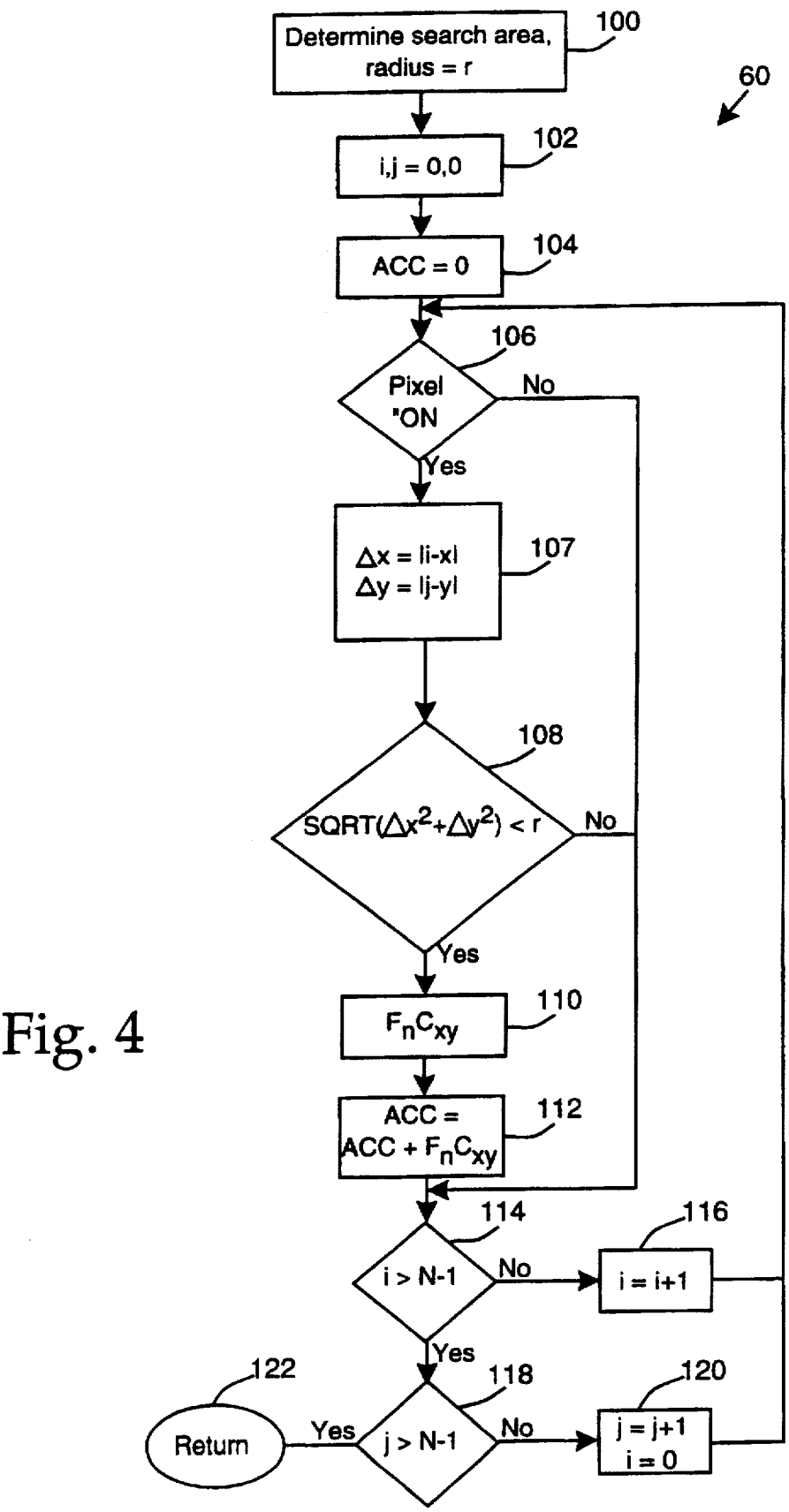
FIG. 4 is a flow diagram showing detail of determining the cost function for a candidate pixel in connection with the process illustrated in FIG. 2.

FIG. 4 illustrates in greater detail the step of determining a cost function for a candidate pixel (step 60 in FIG. 2). In general, determining the cost function for a candidate pixel requires (1) determining an adequate "search area" around the candidate pixel; (2) determining a respective "cost value" for each ON pixel within the defined search area; and (3) summing those individual cost values to arrive at a total cost function for the candidate.

The cost function must minimize deviation from the desired qualities described above. To review, the cost function must maximize dispersion, enforce diagonal correlation when dispersion fails (dots touch), and minimize visible patterns in both the dot structure and dither matrix tiling.

The cost associated with each candidate pixel must be some function of the pixels surrounding it. In order to calculate the total cost of selecting a candidate pixel, I sum all of the components of that cost, where each component is a function of the state and position of every other pixel within the search area. In its simplest form, the cost function can be described mathematically as follows:

$$\sum_{xy=1}^{xy=FnR} FnC_{xy}$$

Where FnR=a function defining a search area with the candidate pixel at its center.
Where FnC=a function that returns a cost value with the position and state of each pixel in region FnR as its inputs.
Where xy denotes each individual pixel within region FnR.

The Search Area

The first issue here is to determine what search area is appropriate for this cost function to behave correctly (FnR). I have determined that the results of the cost function stabilized once a wide enough search radius is used. The radius required also proved to be a function of the number of ON dots within the area. The result is that the search area defined by FnR is a circle with a radius large enough to include a sufficient number of ON dots. This may be determined empirically for a particular target device, and of course involves tradeoffs of processing speed. I have found that the search area must be large enough to include at least a minimum of approximately 10–15 ON dots to get good results. Preferably, the search area should be large enough to include 50 ON dots. There is little benefit to searching over a larger area in the example of a 128 by 128 matrix having 256 gray levels. The radius required to include 50 ON dots is easily calculated using tone level as an indicator of average ON dot density.

The following Table 1 shows search area radius adequate to include 50 ON dots as a function of selected tone level. The last column shows the total number of dots within the search area.

TABLE 1

Search Area for Constant Number of ON Dots

| TONE LEVEL | PERCENT TONE | SEARCH RADIUS | TOTAL PIXELS |
|---|---|---|---|
| 1 | 0.4 | 63.83 | 12,800 |
| 4 | 1.6 | 31.92 | 3,200 |
| 5 | 2.0 | 28.55 | 2,560 |
| 10 | 3.9 | 20.19 | 1,280 |
| 25 | 9.8 | 12.77 | 512 |
| 32 | 12.5 | 11.28 | 400 |
| 50 | 19.5 | 9.03 | 256 |
| 64 | 25.0 | 7.98 | 200 |
| 128 | 50.0 | 5.64 | 100 |
| 150 | 58.6 | 5.21 | 85 |
| 200 | 78.1 | 4.51 | 64 |
| 250 | 97.7 | 4.04 | 51 |
| 256 | 100.0 | 3.99 | 50 |

Discrete "White Specks" May Affect Search Area

An alternative method of sizing the search area is to ensure that the search area covers as many discrete events as possible, in terms of what the eye "sees". For that reason, the radius of the search area for tone levels below 128 (50 percent) would increase as the tone level decreases, so that the search radius is very large in very sparse regions. However, when the tone level exceeds 50 percent, black (the cumulative effect of the ON dots) is actually the majority, and it is the white spaces that are in the minority. In that case, what is more noticeable to the eye are the white "specks". In other words, the white specks become the discrete events and the black becomes the background. Thus, the locations that we have been ignoring, i.e. the OFF pixels, are visually most significant. So, to better accommodate the human visual system, the selected search area has to take into account an adequate number of those white specks, rather than the ON dots. Thus, the search radius should increase as the tone level increases for tone levels above 50 percent. Using this alternative approach, a plot of search radius versus tone level would have a generally U-shape curve with a minimum cusp at 50 percent tone level.

FIG. 4 illustrates a method of determining the cost function for a candidate pixel located at M(x,y). This process begins by selecting a search area having a radius equal to r, in step 100. Either of the strategies described above for sizing the search area may be used. In step 102, horizontal and vertical indexes i,j are initialized to zero. An accumulator ACC also is initialized to zero in step 104. Following initialization, test 106 determines whether the current pixel is ON. If so, this pixel may have some affect in determining the cost of the current candidate pixel. Step 107 determines the horizontal distance $\Delta x$ between the candidate pixel and the current pixel, which is the absolute value of i−x. Similarly, the vertical distance $\Delta y$ is determined as the absolute value of j−y. Test 108 determines whether the current pixel is within the defined search radius. If it is not, the current pixel location may be ignored and the process proceeds to examine the next location.

If the current pixel is within the search area, step 110 determines a cost value for this pixel, as further described below. That cost value is added to the accumulator in step 112. Step 114 determines whether the column index (i) has reached the end of the current row. If not, the column index is incremented in step 116 and control returns to step 106 to examine the next pixel. At the end of a row, test 118 determines whether the current row is the last row in the matrix. If not, the row index (j) is incremented and the column index i reset in step 120, and again control returns to step 106 to examine the next location. This process is repeated, essentially examining every pixel in the dither matrix. Although raster sequence is illustrated, the order of examining the pixels is immaterial. The cost value determined in step 110 for every ON pixel within the defined search area is accumulated in step 112 so that, at the conclusion of this process, the accumulator contains the sum of all of the cost values for the candidate pixel under consideration. In other words, the accumulator then contains the total cost function for the current pixel. Since the flow diagram of FIG. 4 illustrates determining the cost function, step 60 of FIG. 2, control then returns in step 122 of FIG. 4 to step 64 of FIG. 2, described above.

Radial Distance Considerations

To maximize dispersion, the value of the cost function, FnC should be an inverse function of distance between the candidate and each "ON" dot in the search area, or $$FnC_{xy} = 1/r$$

Where r is the radial distance between the candidate pixel and each "ON" dot within the search area. This would give the least cost value to candidate pixels that are the greatest distance from other dots. However, the largest "hole" is preferred even if that hole has lots of dots on one side and only a few on the other. A simple inverse function would be heavily influenced by this "clump of dots" on one side. Because of this, I modify FnC to provide exponentially more weight to near dots. This has the effect of making only the closest dot in the "clump" very significant in the total cost for a candidate, satisfying the largest "hole" observation. I have determined that a cube function is the minimum power required to achieve this effect. Therefore, the modified cost function has the general form:

$$FnC_{xy} = (1/r)^3$$

Output Dot Size Calibration

The cost function, in the above form, will maximize dispersion. As more and more dots are placed in the dither matrix, and the distance between dots becomes less and less, dots will eventually have to touch each other. In order to enforce this touching at diagonals (45 degrees), this function must vary in response to relative angle and distance between the candidate and each "ON" pixel in the defined search area. Using as a cost function FnC as defined above, the described method would first select pixels that are two units of distance away before pixels that are the square root of two units away (unit diagonals), and finally would select pixels that are one unit away (unit horizontals and verticals). That would satisfy the stated preference in that unit diagonals are selected before unit horizontals and verticals.

However, some target output devices, e.g. ink-jet printers (using certain output media), produce output dots (drops of ink) that touch each other even when they are more than one unit apart. For example, the output dot size may be such that adjacent dots touch each other when placed two units apart. We want to enforce diagonal correlation when adjacent dots touch, even if they are logically located two units apart. In order to enforce the diagonal correlation quality in that case, the radial distance term r in the denominator of the cost function is adjusted by an amount that depends on the output dot size. Specifically, the "adjusted r" value varies between r (the actual radial distance) and some value that compensates for dot size. The necessary compensation will depend on the target output system. Because dot size (or "dot touch distance") is variable among different output systems, I express it as a variable (C) in the cost function.

In the preferred embodiment, designed for ink-jet printers, two units is the maximum distance within which dots touch one another, so C equals two. The complete cost function may be expressed as $$\left( \frac{1}{r + (C - \sqrt{2})(\sin 2\alpha)\left(\frac{\sqrt{2}}{r}\right)} \right)^3$$

The following Table illustrates the cost values for selected radial distances and relative angles determined according to the above formula, for C=2. In the denominator, the correction term added to r has three components. First, C-SQRT(2) is the maximum correction, as it is the difference between the minimum touching distance and a unit diagonal radial distance. The second component, sine (2α), varies with relative angle so as to peak (value of 1) at 45 degrees, and fall off to 0 at 0 and 90 degrees. So no adjustment takes place for true vertical and horizontal distances. The third component, SQRT(2)/r is a function of distance. It peaks when r is a minimum, namely 1. So the maximum adjustment takes place when dots are close to a candidate pixel, and at 45 degrees. Under those conditions, the denominator is a maximum, so the cost value is a minimum. The following table illustrates the effects of angle and distance.

TABLE 2

Cost Values for Selected Radial Distance and Relative Angles.

| Radial Distance | Relative Angle (degrees) | | | | | | |
|---|---|---|---|---|---|---|---|
| | 0 | 15 | 30 | 45 | 60 | 75 | 90 |
| 1.00 | 1.00 | 0.35 | 0.20 | 0.16 | 0.20 | 0.35 | 1.00 |
| 1.41 | 0.35 | 0.20 | 0.14 | 0.13 | 0.14 | 0.20 | 0.35 |
| 2.00 | 0.13 | 0.09 | 0.08 | 0.07 | 0.08 | 0.09 | 0.13 |
| 3.00 | 0.04 | 0.03 | 0.03 | 0.03 | 0.03 | 0.03 | 0.04 |
| 4.00 | 0.02 | 0.01 | 0.01 | 0.01 | 0.01 | 0.01 | 0.02 |

Figure 5:
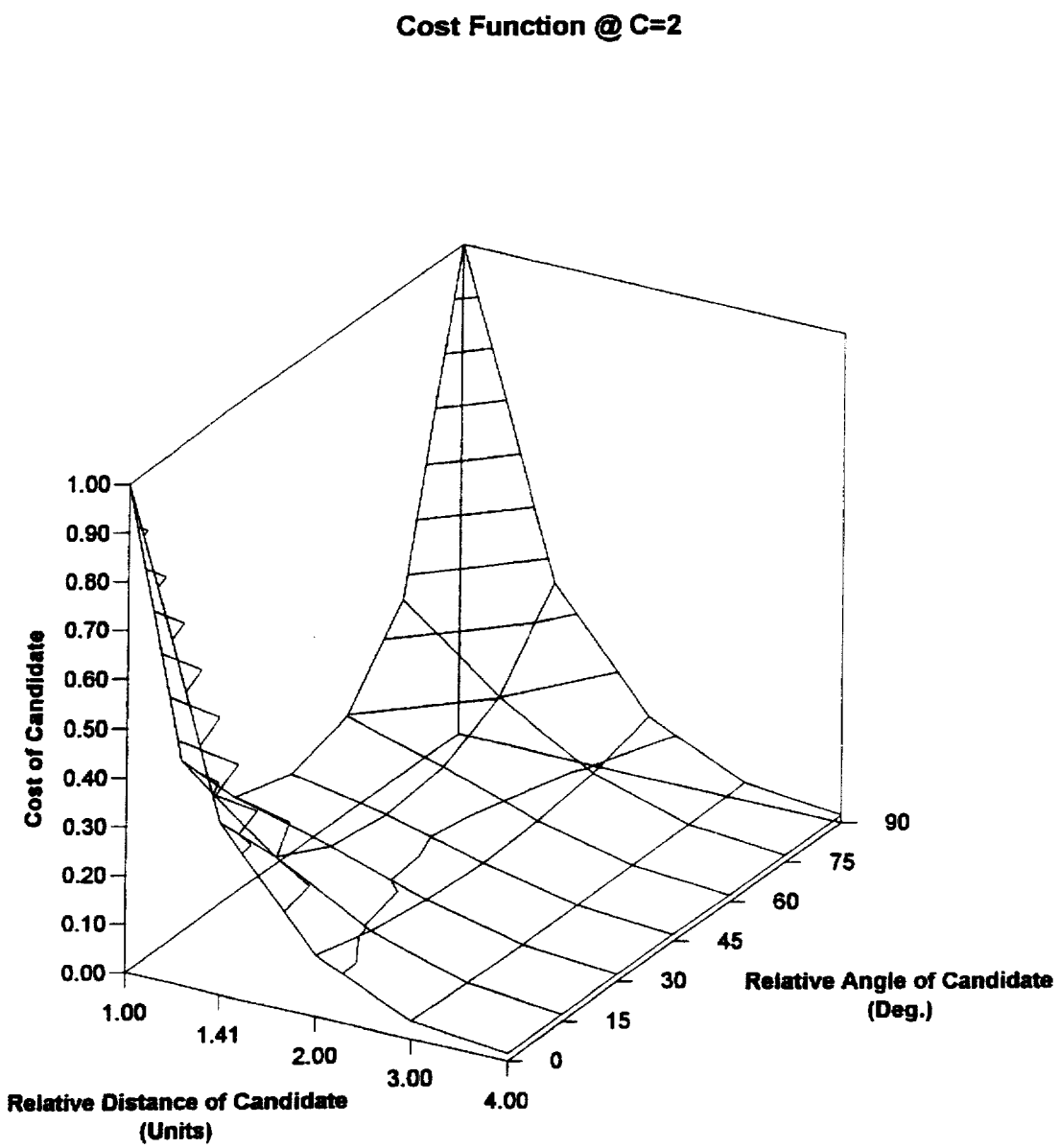
FIG. 5 is a three-dimensional representation of a cost function useful for determining cost values in the method of FIG. 4.
Figure 6A:
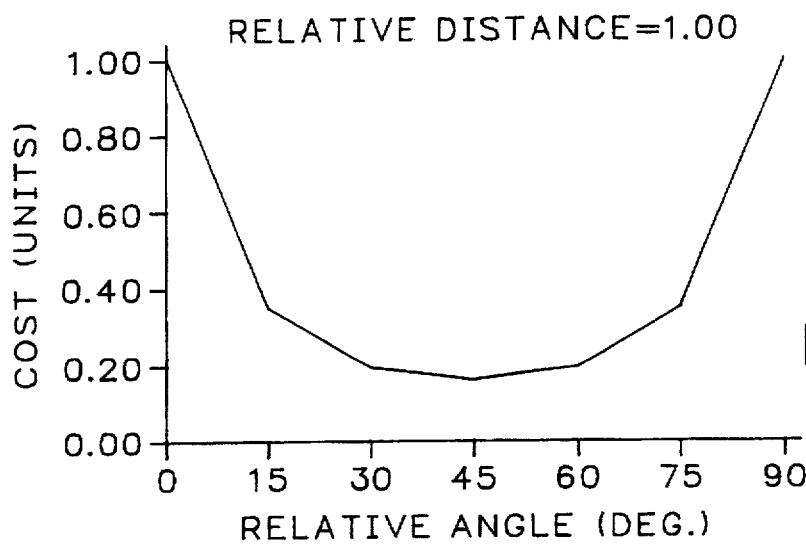
FIGS. 6(a) through 6(e) are a series of plots illustrating the cost function of FIG. 5 versus relative angle between a candidate pixel and an ON dot.
Figure 6B:
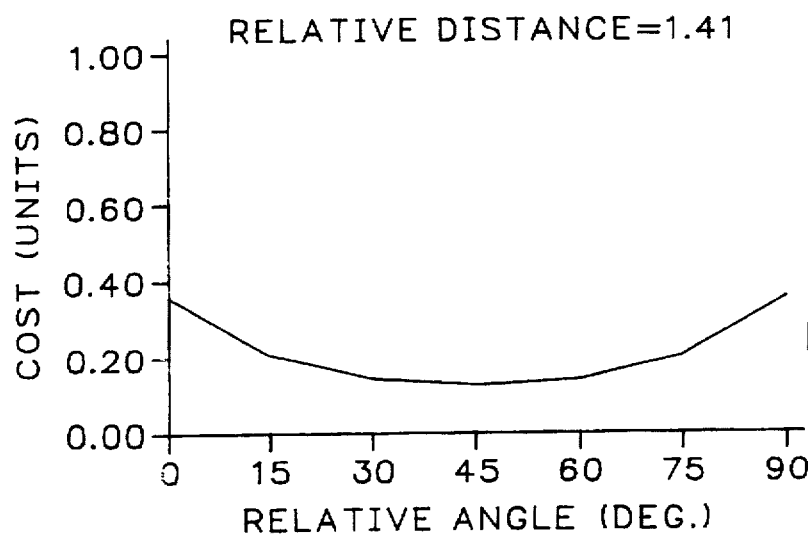
Figure 6C:
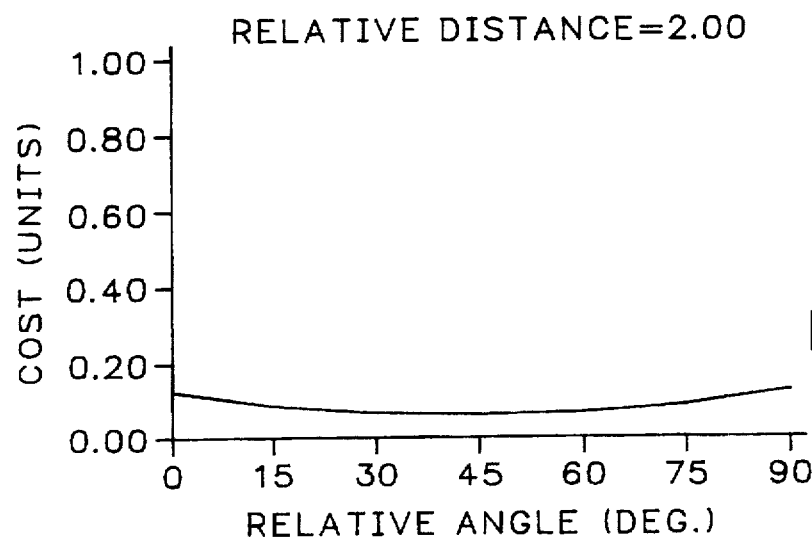
Figure 6D:
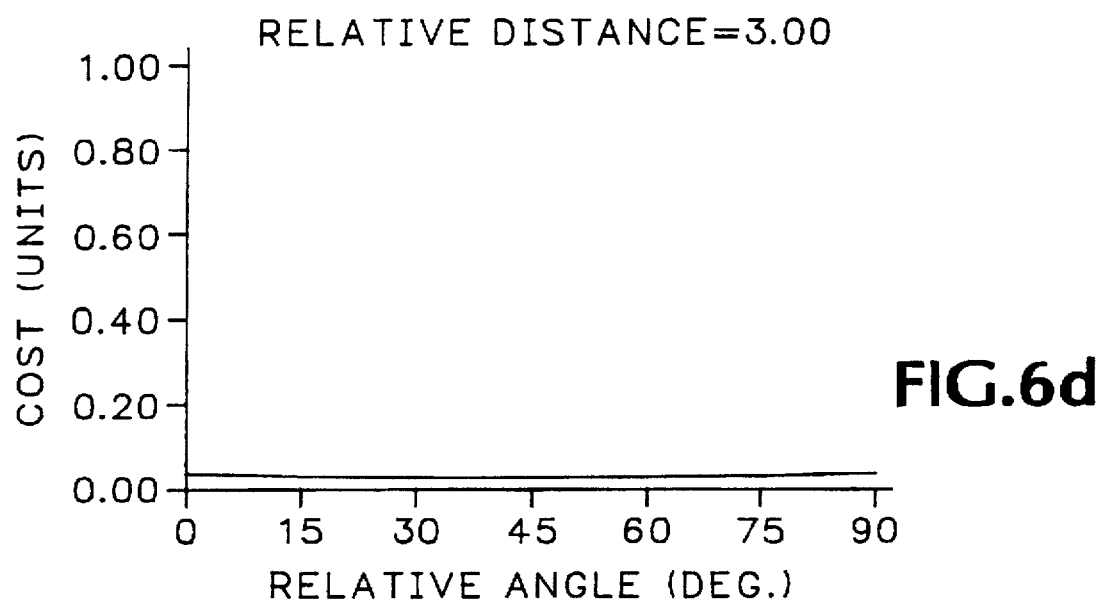
Figure 6E:
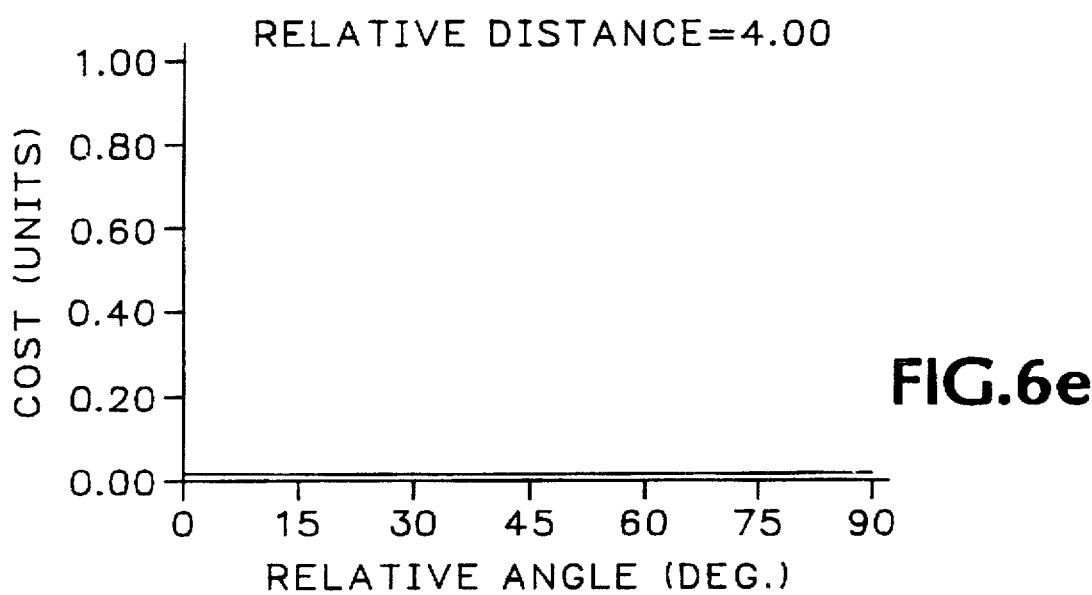

The Table values are rounded. For example, a unit diagonal has radial distance of 1.41 (square root of 2) and angle 45 degrees. The cost function formula denominator would be: SQRT(2)+[C-SQRT(2)[×[sine(45)]×[SQRT(2)/SQRT(2)]=SQRT(2)+[C-SQRT(2)]×1 ×1 =C=2. So the cost function is ½ cubed or ⅛=0.125. The Table shows the rounded value of 0.13. FIG. 5 is a three-dimensional plot of cost value versus relative angle and measured relative distance. It may be observed that the cost value is a strong function of angles for short distances but is significantly less affected by the relative angle as distance increases. FIG. 6 is a series of plots essentially showing the function of FIG. 5 decomposed. FIGS. 6(a) through 6(e) show the cost function as a function of relative angle for radial distances 1, 1.14, 2, 3 and 4, respectively.

Sample Partial Dither Matrix

Figure 3:
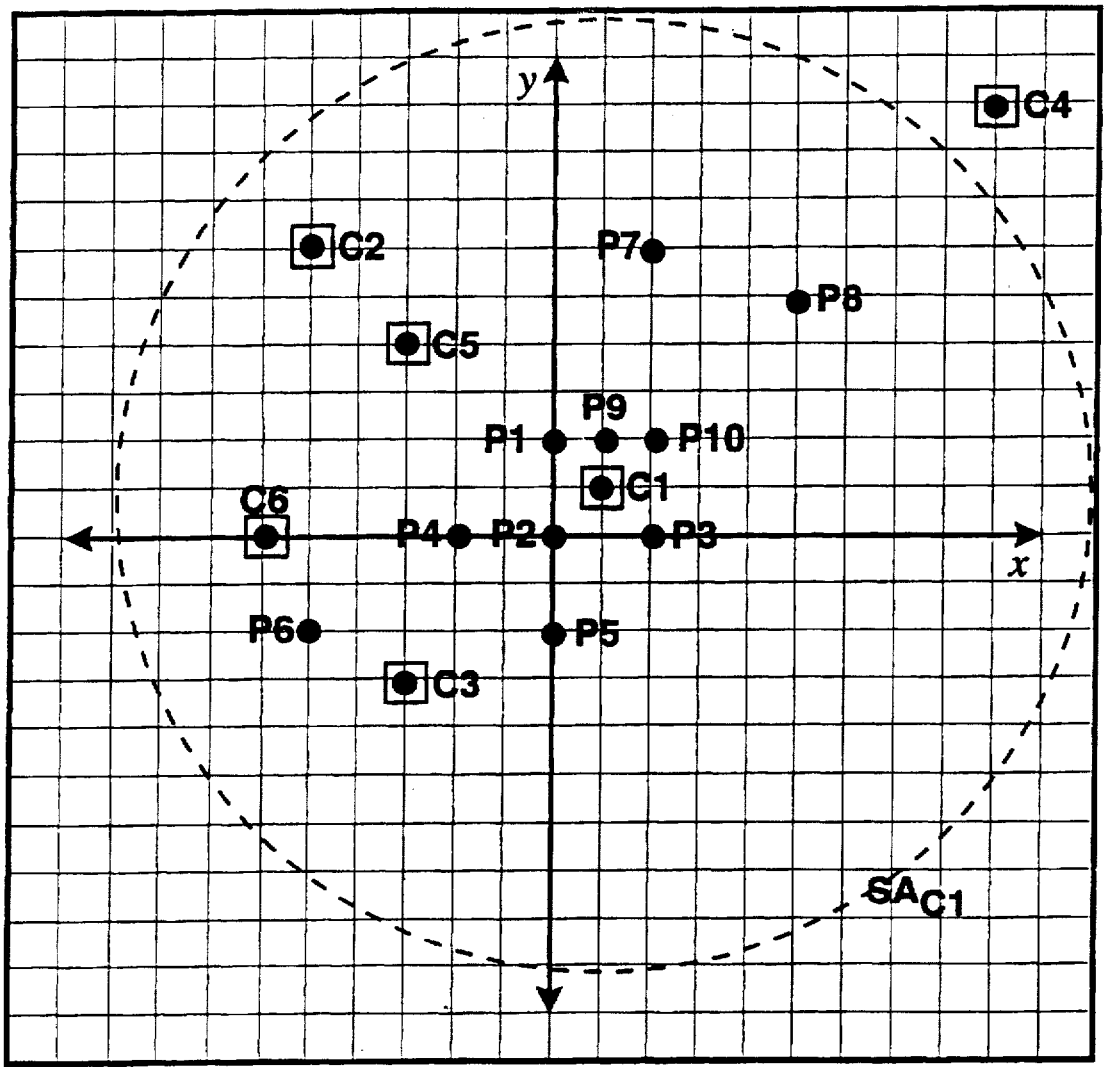
FIG. 3 shows an ensemble of ON dots in a matrix and selected candidate pixels for illustrating the method of FIG. 2.

FIG. 3 illustrates a portion of a dither matrix. The portion illustrated in FIG. 3 is 22 units on a side, though this is merely for illustrating operation of the cost function and the dimensions are arbitrary. The plot shows x and y orthogonal axis for reference. It shows an ensemble ten ON pixels labeled P1 through P10 respectively. The ON dot locations are selected merely for purposes of illustration, and do not reflect an arrangement of dots likely to occur according to the present methodology. Selected candidate pixels, indicated by a square surrounding the dot location and numbered C1 through C6, respectively, are shown. Again, these are selected for purposes of illustration only. In practice, every OFF dot location within the defined search area is a candidate pixel. The dashed circle in FIG. 3 illustrates a search area surrounding candidate pixel C1, and having a search radius equal to 10 units. In practice, the search radius would be much larger, or the number of ON dots within the search radius would be larger, as described above.

Applying the methodology and the cost function described above to the dots shown in FIG. 3 results in cost values shown in the following Table 3.

TABLE 3

Cost Values for the Dots Illustrated in FIG 3.

| CANDIDATE PIXEL NUMBER | "ON" DOT NUMBER | | | | | | | | | | TOTAL COST |
|---|---|---|---|---|---|---|---|---|---|---|---|
| | P1 | P2 | P3 | P4 | P5 | P6 | P7 | P8 | P9 | P10 | |
| C1 | 0.13 | 0.13 | 0.13 | 0.03 | 0.03 | 0.00 | 0.01 | 0.01 | 1.00 | 0.13 | 1.57 |
| C2 | 0.00 | 0.00 | 0.00 | 0.00 | 0.00 | 0.00 | 0.00 | 0.00 | 0.00 | 0.00 | 0.00 |
| C3 | 0.00 | 0.01 | 0.00 | 0.03 | 0.03 | 0.14 | 0.00 | 0.00 | 0.00 | 0.00 | 0.22 |
| C4 | 0.00 | 0.00 | 0.00 | 0.00 | 0.00 | 0.00 | 0.00 | 0.01 | 0.00 | 0.00 | 0.01 |
| C5 | 0.02 | 0.01 | 0.00 | 0.01 | 0.00 | 0.00 | 0.01 | 0.00 | 0.01 | 0.00 | 0.07 |
| C6 | 0.00 | 0.00 | 0.00 | 0.02 | 0.00 | 0.06 | 0.00 | 0.00 | 0.00 | 0.00 | 0.10 |

Table 3 shows, for each candidate pixel, the individual cost values attributable to each of the surrounding ON pixels P1 through P10. The sum of the individual cost values, shown in the right-most column, is the total cost function for the corresponding candidate pixel. Since candidate pixel number 2 has the minimum cost function (among the selected candidate pixels illustrated), it would be selected to be the next ON dot in step 78 of FIG. 2.

Several observations may be made about the values shown in Table 3. First, they fall within a range of zero to 1. Referring to candidate pixel number 1, it may be observed that ON dots P1, P2, P3 and P10 all have the same individual cost value, namely 0.13. Referring to FIG. 3, all of those pixels are one diagonal unit from the candidate pixel C1. The ON pixel P9 has a cost value equal to 1.00, the maximum value as it is one unit away vertically. Thus, the unit diagonals would be substantially favored over a vertical or a horizontal. Candidate pixel C2 has a negligible cost function due to its substantial distance from all of the ON dots.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A printed product comprising:

a paper substrate; and a plurality of substantially equal size drops of ink deposited on the substrate forming dots to create a halftoned printed image;

all of the dots in the image that touch one another being arranged at a predetermined angle relative to each other, while dots that do not touch adjacent dots are generally homogeneously dispersed, thereby minimizing visual artifacts in the image;

said printed product having said dots printed in predetermined dot positions on said substrate, wherein two dots aligned horizontally or vertically and separated by one dot position on said substrate partially overlap;

where an arrangement of dots on said substrate is formed by utilizing a point by point thresholding comparison to a predetermined diagonal correlation dither matrix comprising:

segmenting a gray scale image into pixel areas;

thresholding each of said pixel areas against a predetermined diagonal correlation dither matrix to generate a halftone dot pattern for each of said pixel areas, said dither matrix being substantially comprised of a function that, at least intermittently, forces diagonal correlation of adjacent dots in said halftone dot pattern over vertical or horizontal correlation of non-adjacent dots separated by one dot position in said halftone dot pattern, while also forcing a substantially homogeneous dispersion of dots, thereby producing visually unobtrusive output dot patterns; and printing said halftone dot pattern on said substrate to display a halftone rendering of said gray scale image.

2. A printed product according to claim 1 wherein dots on said substrate that touch one another are arranged at approximately forty-five degree angles relative to each other.

3. A printed product comprising:

a paper substrate; and a plurality of substantially equal size drops of ink deposited on the substrate forming dots to create a halftoned printed image;

all of the dots in the image that touch one another being arranged at a predetermined angle relative to each other, while dots that do not touch adjacent dots are generally homogeneously dispersed, thereby minimizing visual artifacts in the image;

said printed product having said dots printed in predetermined dot positions on said substrate, wherein two dots aligned horizontally or vertically and separated by one dot position on said substrate partially overlap;

where an arrangement of dots on said substrate is formed by generating and using a diagonal correlation dither matrix comprising:

setting a matrix of pixels so that each of said pixels are in an OFF state;

initializing the matrix to a predetermined initial state corresponding to a lowest gray scale tone level consisting of only one pixel in the matrix being set to an ON pixel;

identifying as candidate pixels all of the OFF pixels in the matrix;

determining a cost value sum for each candidate pixel based on respective radial distances and relative angles between a respective candidate pixel and the ON pixels within a predetermined search area surrounding said respective candidate pixel, where a single cost value is obtained for substantially each candidate pixel based on its radial distance and relative angle with respect to a single ON pixel within said predetermined search area, wherein a single cost value for a candidate pixel diagonally adjacent an ON pixel is less than a single cost value for a candidate pixel vertically or horizontally adjacent an ON pixel;

comparing the respective cost value sums of the candidate pixels to determine a lowest cost value sum for the candidate pixels;

selecting one of the candidate pixels that has the lowest cost value sum;

turning ON the selected candidate pixel in the matrix;

repeating said identifying, determining, comparing, selecting and turning ON steps until the number of ON pixels in a resulting matrix corresponds to the desired tone level, said resulting matrix forming a threshold matrix which when thresholded against a corresponding gray scale tone level identifies a halftone dot pattern corresponding to said ON pixels in said resulting matrix;

storing each resulting threshold matrix for each tone level in a memory, an accumulation of resulting threshold matrices providing said dither matrix;

thresholding said dither matrix against a gray scale image to produce a halftone image for display; and printing said halftone dot pattern on said substrate to diplay a halftone rendering of said gray scale image.

4. A printed product according to claim 3 wherein said dots on said substrate that touch one another are arranged at approximately forty-five degree angles relative to each other.

* * * * *